United States Patent
Amento et al.

(10) Patent No.: US 7,148,879 B2
(45) Date of Patent: Dec. 12, 2006

(54) BIOACOUSTIC CONTROL SYSTEM, METHOD AND APPARATUS

(75) Inventors: Brian Amento, Morris Plains, NJ (US); William Colyer Hill, Montville, NJ (US); Loren Gilbert Terveen, Warren, NJ (US)

(73) Assignee: AT&T Corp., New York, NY (US)

( * ) Notice: Subject to any disclaimer, the term of this patent is extended or adjusted under 35 U.S.C. 154(b) by 1253 days.

(21) Appl. No.: 09/898,108

(22) Filed: Jul. 3, 2001

(65) Prior Publication Data

US 2002/0009972 A1    Jan. 24, 2002

Related U.S. Application Data

(60) Provisional application No. 60/265,212, filed on Jan. 31, 2001, provisional application No. 60/216,207, filed on Jul. 6, 2000.

(51) Int. Cl.
*G09G 5/08*    (2006.01)

(52) U.S. Cl. .................. 345/158; 345/160; 345/162

(58) Field of Classification Search ........... 345/158, 345/160, 162
See application file for complete search history.

(56) References Cited

U.S. PATENT DOCUMENTS

| | | | | |
|---|---|---|---|---|
| 5,319,747 A | * | 6/1994 | Gerrissen et al. | 715/839 |
| 6,115,482 A | * | 9/2000 | Sears et al. | 382/114 |
| 6,151,208 A | * | 11/2000 | Bartlett | 361/683 |
| 2003/0048915 A1 | * | 3/2003 | Bank | 381/326 |

FOREIGN PATENT DOCUMENTS

JP        04-317638 A  * 11/1992

* cited by examiner

*Primary Examiner*—Richard Hjerpe
*Assistant Examiner*—Leonid Shapiro

(57) ABSTRACT

Bioacoustic sensors and wireless technologies are used for the control of electronic devices, such as a wireless telephones, pagers, music/media players or personal, laptops and personal digital assistant devices (PDA). Such control is implemented with certain systems, methods and apparatus which include bioacoustic sensors, a processor coupled to the bioacoustic sensors, and a transmitter coupled to the processor. The present invention is operative to detect particular hand and/or finger gestures, and to transmit control signals corresponding to the gestures for operative control of an electronic device.

19 Claims, 4 Drawing Sheets

BIOACOUSTIC CONTROL SYSTEM, METHOD AND APPARATUS

This applications claims priority to U.S. Provisional application Ser. No. 60/216,207 filed Jul. 6, 2000 and U.S. Provisional application Ser. No. 60/265,212 filed Jan. 31, 2001 which are both incorporated by reference herein.

BACKGROUND OF THE INVENTION

The present invention relates to the field of user interfaces for portable electronic devices, and more particularly to a system, method and apparatus for sensing and interpreting finger gestures and movements to control and provide input to electronic devices.

Portable electronic devices have become increasingly popular. Examples of these devices include wireless or cellular telephones, personal digital assistants (PDAs), pagers and audio or music delivery devices. Some devices have become increasingly small such that they are now deemed "pocketable" and/or "wearable."

A portable electronic device typically has a user interface for operative control. Most if not all conventional user interfaces for such portable electronic devices employ physical buttons, stylus, or voice control. In some devices, a large number of operations or functions are possible with the user interface.

One major shortcoming of these prior art user interfaces is that the user must physically retrieve and position the portable electronic device appropriately for physical contact therewith, for example, by utilizing a stylus to provide commands upon a touch sensitive screen of a PDA or by manually depressing function buttons on a portable media player. In addition, as the size of a device becomes smaller, the interface becomes increasingly inappropriate from an ergonomic standpoint. Voice controlled systems may alleviate some of these problems, however, the major shortcoming of a voice-controlled interface is that the user must speak openly in such a way that other nearby people may hear. Many voice controlled systems are also extremely sensitive to environmental noise and interference.

Accordingly, it would be desirable to have a system, method and apparatus for improving the shortcomings of prior art electronic device control systems.

SUMMARY OF THE INVENTION

The present invention is a system, method and apparatus for controlling and providing data, signals and commands to electronic devices such as wireless phones, Personal Digital Assistants (PDAs), music players/recorders, media players/recorders, computers such as laptops or other portable computers, public telephones and other devices. As described herein, the inventive systems, methods and apparatus involve the use of bioacoustic or contact sensing technology, adaptive training methods and wireless technology for the control of such electronic devices.

In one embodiment, the present invention is a method for controlling an electronic device which includes receiving one or more bioacoustic signals, each signal related to one or more hand gestures, determining the identity of the one or more hand gestures based on a positive correlation between the received signals and predetermined hand gesture data and selectively issuing one or more commands associated with the identified hand gesture for activating one or more functions of the electronic device.

In another embodiment, the present invention is a wrist adaptable wireless apparatus for invoking functions of a portable wireless device including a processor coupled to at least one piezo-electric contact microphone which receives sensor signal data, a storage facility for storing a plurality of gesture pattern wherein the processor operative to compare sensor signal data with the plurality of gesture patterns, to detect a substantial match between the sensor signal data and one of the plurality of gesture patterns, and to select one of a plurality of user input commands associated with the match, wherein the plurality of user input commands correspond to a plurality of functions of the portable wireless device; and a wireless transmitter coupled to said processor and operative to wirelessly transmit the user input command to the portable wireless device.

In yet another embodiment, the present invention is a wireless control system including a bioacoustic sensor component, a digital processor coupled to the sensor component, a storage component for storing gesture pattern data indicative of a plurality of gestures, each gesture corresponding to a unique one of a plurality of electronic device commands wherein the processor is operative to compare acoustic sensor signals with the gesture pattern data and to select one of the electronic device commands corresponding to a gesture that correlates with the acoustic sensor signals and a wireless transmitter and antenna coupled to the processor and operative to transmit the electronic device command.

DETAILED DESCRIPTION

Figure 1:
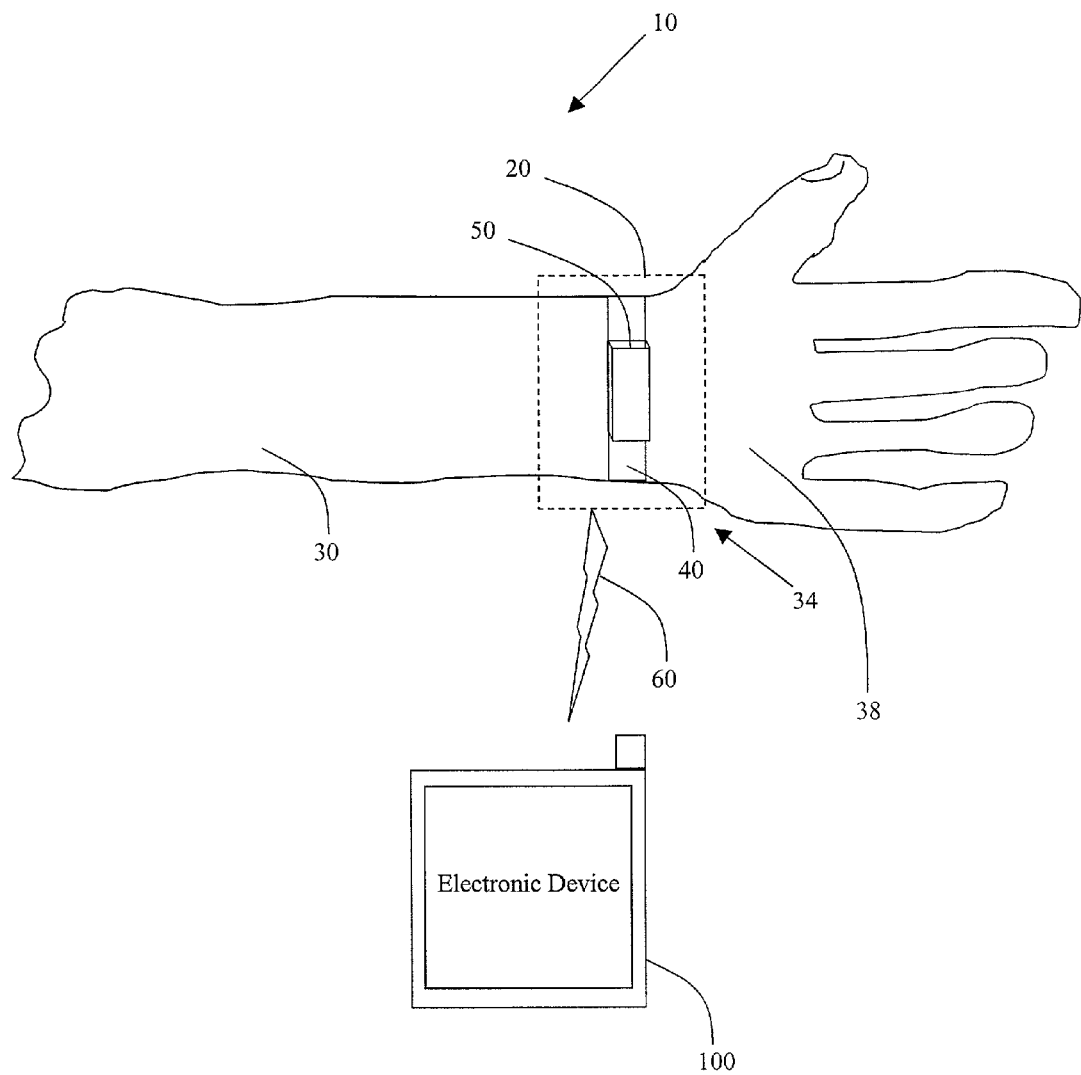
FIG. 1 illustrates an exemplary system of the present invention.

Referring to FIG. 1, one embodiment of a system 10 for controlling electronic devices is shown. In this embodiment, system 10 includes a wireless bioacoustic apparatus 20 which is in communication with an electronic device 100. As used herein, the term "electronic device" may include laptops, mobile phones, personal digital assistants (PDAs), handhelds, PCs, pagers, music players/recorders, media players/recorders and other electronic devices. For example, the present invention may be used to activate certain play functions such as stop, pause, play, rewind and record on a media player/recorder device without having the user manually activate the device in a conventional fashion. In the present invention, bioacoustic apparatus 20 is operative to communicate to electronic device 100 via over the air signals 60, such as radio frequency (RF) signals, infrared signals, microwave signals or other suitable over-the-air signals using a variety of wireless standards and protocols like IEEE 802.11, Bluetooth, etc. or other similar methodologies, like via a capacitive body network. Accordingly, it is contemplated that electronic device 100 will have a facility for receiving and processing such signals in order to translate the signals into the corresponding device commands or sequences. Such a facility, in one exemplary embodiment, may be an RF receiver and processor for receiving RF signals and effectuating the commands corresponding to the signals on the electronic device.

In one embodiment, apparatus 20 includes a band 40 having bioacoustic sensor material formed therein or attached thereto. Band 40 has a signal processing component 50 attached thereto which may includes components such as a signal amplifier, a digital processor, a memory, a broadcast component, an encryption module and an antenna, as discussed in more detail later herein. Bioacoustic sensor material may be one or more piezo-electric contact materials or films (also referred to herein as microphones). Preferably, band 40 is sized and configured to fit around a human arm 30. More preferably, band 40 is sized and configured to fit around a distal end 34 of human arm 30, proximate to a human hand 38. In one embodiment, the material of band 40 may be constructed of fabric, elastic, links, or other structure capable of incorporating bioacoustic sensor material, such as bioacoustic material incorporating one or more piezo-electric contact microphones therein. In a preferred embodiment, band 40 has an outer surface and an inner surface, wherein signal processing component 50 is attached or affixed to the band outer surface and the bioacoustic sensor material is formed or attached to an inner surface of band 40. In this configuration, the bioacoustic material is positioned to receive bioacoustic signals from the user. In the present invention, the bioacoustic or piezo-electric material is optimized for sensing vibration in human skin over the ulna bone at the wrist. The internal sound is conducted by the bones of the hand and wrist to the ulna below the wristband sensor. Airborne sound does not register in the wristband.

As discussed in more detail later herein, signal processing component 50 may be configured in a wristwatch or wristwatch like configuration and incorporate one or more of a signal amplifier, digital processor, broadcast facility, memory and other components which are operative to receive, process and provide bioacoustic signals.

Figure 2:
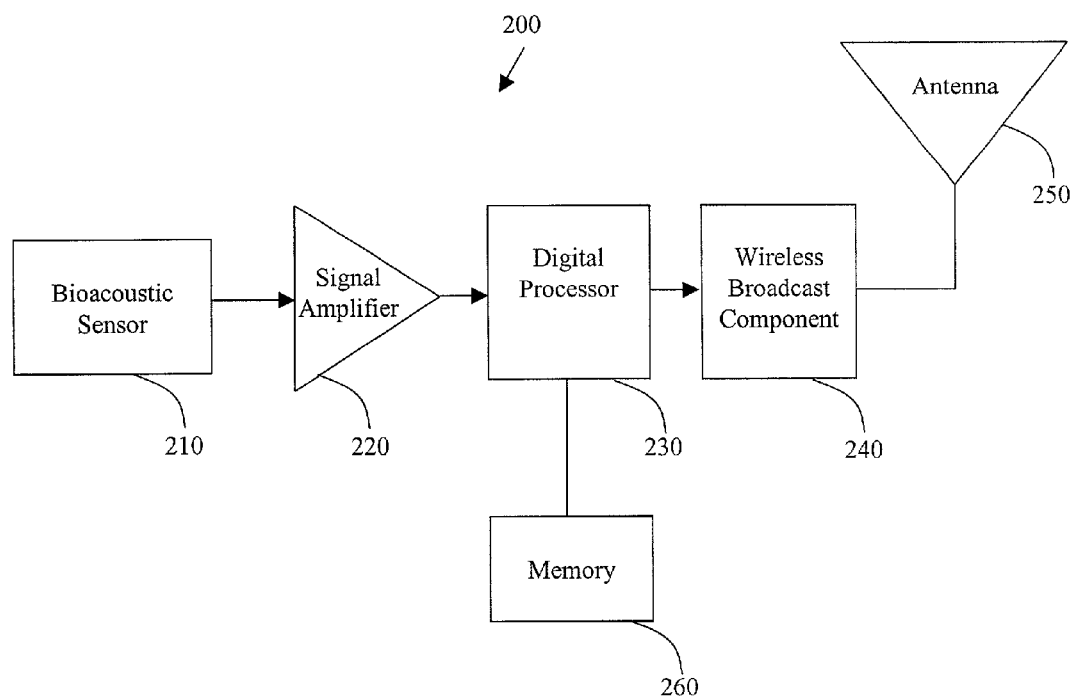
FIG. 2 illustrates an exemplary system configuration of the present invention.

Referring to FIG. 2, an exemplary apparatus configuration 200 is shown. In this embodiment, configuration 200 includes a bioacoustic sensor 210, a signal amplifier 220, a digital processor 230, a wireless broadcast component 240, such as a small-field or narrowcast broadcast device which is coupled to an antenna 250. In one embodiment, signal amplifier 220, digital processor 230, wireless broadcast device 240 and antenna 250 are embedded or integrated in a wrist mount or wristwatch-like configuration, such as shown in FIG. 1 with respect to signal processing component 50. Configuration 200 may also include a memory 260 which is coupled to digital processor 230. A power source, such as a battery, not shown, may also be integrated within apparatus configuration 200. In another embodiment, apparatus configuration 200 may include an audio feedback mechanism, not shown, for emitting audio feedback to the user when a user gesture is sensed. In yet another embodiment, apparatus configuration may include an auxiliary information component, not shown, which can receive and display small amounts of information such as sports scores, stock quotes, weather and appointments received from third party providers. In a further embodiment, apparatus configuration 200 may include an encryption module for encrypting signals, for example, that are transmitted via wireless broadcast component 240. In one embodiment, these signals are narrowcasted from the apparatus which encrypts the signals via an encryption module and then broadcasts commands to an electronic device such as a wireless phones, handheld computers or any nearby devices equipped with appropriate receiver and decrypting facilities for decrypting the encrypted signals.

In the present invention it is contemplated that one or more of the various apparatus components or elements, such as digital processor 230, wireless broadcast device 240, antenna 250, memory 260 and other components such an encryption module may be remotely located from bioacoustic sensor. For example, such component or elements may be integrated into a container which is placed in a region other than the user's arm, such as in a belt configuration or other remote configuration.

In another embodiment, the present invention may be configured with one or more piezo-electric contact microphones, signal amplifier, digital processor, a small-field wireless broadcast device and antenna embedded in a finger ring plus a wristwatch amplifier/repeater, not shown. In this embodiment, the wristwatch contains a larger battery than the ring and rebroadcasts gesture commands to the user's wearable devices once received from the ring. The wristwatch can also receive and display small amounts of information such as sports scores, stock quotes, weather and appointments.

In such an embodiment, sensing is performed at the finger ring of the bone-conducted sound of index and middle finger contacts with the thumb. Once sensed, these signals are narrowcasted from the sensing ring to the wristwatch which encrypts and broadcasts commands to worn cell phones, handheld computers or any nearby digital devices equipped with appropriate receiver. However, in such an embodiment, the broadcast signals can only be decrypted by authorized digital devices.

In yet another embodiment of the invention, a fingernail (or thumbnail) mounted, or ring-mounted touch-edge and touch-surface device that emits coded audio tones into the finger (or thumb) to be picked up by a wrist unit controller and relayed forward to the controlled wearable device is used. In still another embodiment, a narrow-casting infra-red remote control embedded in a watch configuration for control of devices in any environment is used. In another embodiment, coded audio is emitted out from the wrist through the hand to grasped objects such as door knobs for unlocking and locking doors. In still another embodiment, coded audio is received from objects grasped by the hand and relays the audio signals from the wrist to the wearable.

Figure 3:
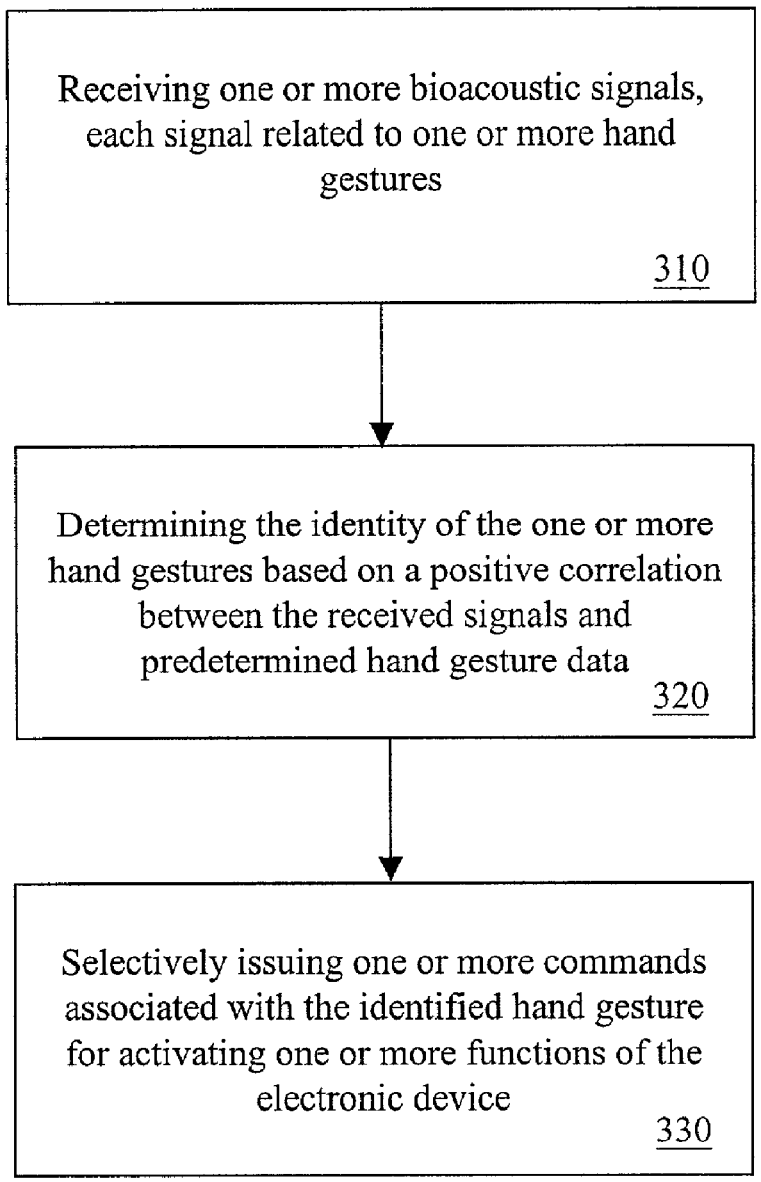
FIG. 3 illustrates an exemplary method of the present invention.

Referring to FIG. 3, an exemplary method of the present invention is shown. In this embodiment, the system receives one or more bioacoustic signals from the user wherein each signal is related to one or more hand gestures, step 310. Once the bioacoustic signal are received, the identity of the one or more hand related gestures is determined based on a positive correlation between the received signals and predetermined hand gesture data, step 320. Once a gesture is identified, one or more commands associated with the identified hand related gesture are issued which activate a corresponding function of an electronic device, such as the user's PDA, laptop, music player, media player, wireless phone, laptop or other similar device.

The invention includes a user-specific training module for machine learning of gesture classification of the finger gesture audio patterns. During the device training session, users are asked by the system to perform hand gestures repeatedly such as "touch index finger to thumb", "touch middle finger to thumb", or "snap your fingers". At the same time the learning component accurately learns the mapping from signal to gesture for the given individual user. Training and adaptation for gesture classification may be performed using a discriminative algorithm. The learning algorithm first maps the high dimensional recordings into an internal compact representation. It then uses a machine learning technique called boosting to find a set of discriminative features. Finally, these features are combined into a single highly accurate yet compact gesture classifier. For example, in one embodiment, a state machine or hidden Markov model (HMM) may be used to classify quantized voltages into gesture classes to control the desired devices.

The present invention is designed to listen for or otherwise sense (via wrist, forearm, fingernail or ring-mounted sensors) naturally occurring fingertip or hand gestures. Exemplary detectable gestures include:

Thumb as anvil—index or middle finger as hammer
Neither ring finger nor pinky used
Thumbpad to fingerpad
Thumbpad to fingernail edge
Fingerpad to thumbnail top
Small gestures: maximum displacement of 5 cm.
Gentle gestures: <10% of pressing strength.
Fingertip tap, double tap
Fingerpad and thumbpad rub
"Money gesture" (rubbing fingers together)
Fingerpad and thumbpad press
Soft flick (fingernail edge outward across thumbpad)
Thumbpad against fingernail edge (back and forth, tap)
Fingerpad on thumbnail edge (back and forth, tap)
Fingerpad on thumbnail surface (2D movement)

In one exemplary embodiment, a finger/thumb tap means select, a finger/thumb double-tap means operate, a money gesture (rub) means scroll. In the present invention sound made by fingertip gestures, worn rings or fingernail-mounted devices, or grasped objects such as doorknobs, light-switches or wall-mounted name-plates may also be sensed by the bioacoustic sensors or microphones.

In another exemplary embodiment, a user wearing a wireless phone and earpiece or headset might listen to voicemails or music using VCR-like "forward", "play", "stop", and "rewind" commands mapped to the tapping of thumb to index finger for "play", thumb to middle finger for "stop", thumb sliding from middle finger to index finger for "forward" and thumb sliding from index finger to middle finger for "rewind". In a public area, the user can make these gestures silently and in a visually concealed and private manner without unholstering any controlled digital device.

Figure 4:
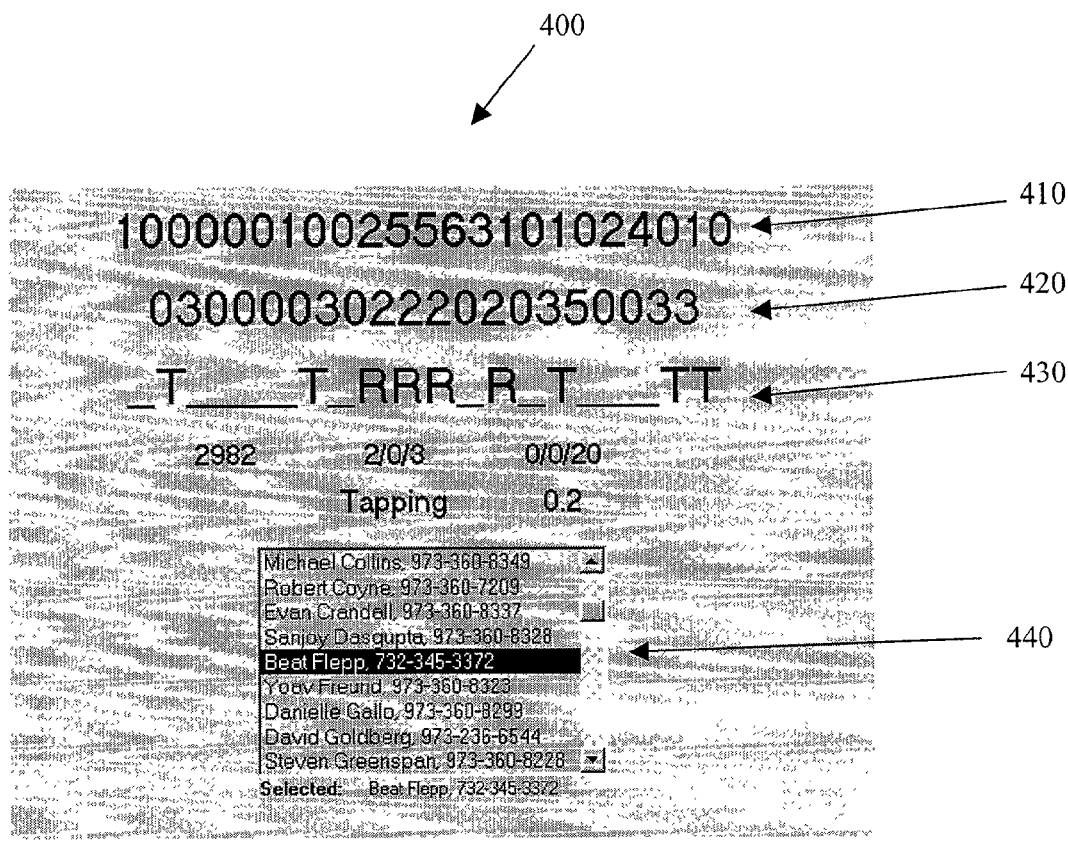
FIG. 4 is an exemplary training scenario screen of the present invention.

Referring to FIG. 4, an exemplary screen display 400 implementing an exemplary gesture classifiers of the present is shown. In this embodiment of the gesture classifier, the classifier is shown in the process of receiving certain bioacoustic signatures of a specific fingertip gesture. Within screen display 400, a top line 410 shows quantized signals every 10th of one second 8000 samples per second. A second line 420 within screen display 400 provides the state of the state-machine classifier algorithm. A third line 430 shows the output classification either R for a rub of the thumbpad against the fingertips or T for a tapping the thumb and index or ring finger.

One or more readout panels may also be provided as shown in FIG. 4. Panel 440 is a cellular phonebook application controlled with fingertip gestures. The application has names of contacts and their respective phone numbers. In this embodiment, for example, rubbing one's fingertips scrolls the application while tapping selects the highlighted name and number for dialing. Of course, other variations and options for controlling the application may be set as desired by the user or as required by the application.

One of the many advantages of the present invention is that users can control digital devices near them without speech or physically manipulating their respective devices. Users control nearby digital devices merely through the use of simple finger gestures with concurrent audio signals sensed, learned, interpreted, encrypted and broadcast to the devices. Furthermore, while the present system, method and apparatus are ideally suited to provide able-bodied users with more convenient, intuitive and efficient ways to control electronic devices, the system, method and apparatus of the present invention would also greatly benefit people with special needs, such as people with severe speech articulation problems or other similar ailments or handicaps which make conventional user interface controls difficult or even impossible to use. It is contemplated that a wearable communication device of the present invention could make big difference in the quality of life of such people.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

We claim:

1. A method for controlling an electronic device comprising:
   receiving one or more bioacoustic signals conducted by finger bones to one or more piezo-electric contact materials (microphones) at a wrist location, each signal related to one or more hand gestures including finger movements;
   determining the identity of the one or more hand gestures based on a positive correlation between the received signals and predetermined hand gesture data; and
   selectively issuing one or more commands associated with the identified hand gesture for activating one or more functions of the electronic device and wherein the one or more hand gestures includes a first gesture which reflects contact between a thumb and an index finger of a human hand, a second gesture which reflects contact between the thumb and a middle finger of the human hand, a third gesture which reflects contact between the thumb and a ring finger of the human hand, a fourth gesture which reflects contact between a finger and a fingernail, a fifth gesture which reflects non-contact between one or more fingers, a sixth gesture which reflects contact based on a displacement threshold and seventh gesture which reflects contact based on a pressure threshold.

2. The method of claim 1, further comprising activating a wireless transmitter to transmit the command.

3. The method of claim 1, further comprising:
amplifying the bone-conducted sound based signals; and
digitizing the bone-conducted sound based signals.

4. The method of claim 1, further comprising:
transmitting the command with a wireless transmitter.

5. The method of claim 1, further comprising:
encrypting the one or more commands associated with the detected hand gesture which includes finger movements.

6. The method of claim 1, further comprising:
decrypting the one or more commands associated with the detected hand gesture which includes finger movements into one or more electronic device commands.

7. The method of claim 1, further comprising:
transmitting the one or more commands with a wireless transmitter.

8. The method of claim 1, further comprising:
narrow casting the one or more commands with a wireless transmitter to the electronic device.

9. A wrist adaptable wireless apparatus for invoking functions of a portable wireless device, comprising:

a processor coupled to at least one piezo-electric contact microphone which receives acoustic sensor signal data;

a storage facility for storing a plurality of gesture patterns which include finger movements, wherein the processor is operative to compare acoustic sensor signal data with the plurality of gesture patterns including the finger movements conducted by finger bones to one or more piezo-electric contact materials (microphones) at a wrist location, to detect a substantial match between the acoustic sensor signal data and one of the plurality of gesture patterns with finger movements, and to select one of a plurality of user input commands associated with the match, wherein the plurality of user input commands correspond to a plurality of functions of the portable wireless device; and a wireless transmitter coupled to said processor and operative to wirelessly transmit the user input command to the portable wireless device.

10. The apparatus of claim 9, further comprising:

a portable power supply.

11. The apparatus of claim 9, wherein the apparatus senses bone-conducted sound of a human hand and bone conducted sound of human fingers of the hand as the acoustic sensor signal data.

12. The apparatus of claim 9, wherein the apparatus is configured as a wristwatch.

13. A wireless control system comprising:

a bioacoustic sensor component;

a digital processor coupled to the sensor component;

a storage component for storing gesture pattern data which includes finger movement data indicative of a plurality of gestures which include finger movements conducted by finger bones to one or more piezo-electric contact materials (microphones) at a wrist location each gesture corresponding to a unique one of a plurality of electronic device commands wherein the processor is operative to compare acoustic sensor signals with the gesture pattern data which includes finger movement data and to select one of the electronic device commands corresponding to a gesture or finger movement that correlates with the acoustic sensor signals; and a wireless transmitter and antenna coupled to the processor and operative to transmit the electronic device command.

14. The system of claim 13, wherein the transmitter is embedded in a ring structure.

15. The system of claim 13, further comprising:

an audio component for providing user feedback when a hand gesture which includes finger movements is sensed.

16. The system of claim 13, wherein the system is operative for receiving information from a plurality of external information sources.

17. The system of claim 13, wherein the processor, storage component and wireless transmitter and antenna are remotely located away from bioacoustic sensor component.

18. The system of claim 13, wherein the band is comprised in part of piezo-electric material.

19. A method comprising:

training a user in one or more hand gestures which includes finger movements so that the one or more hand gestures including finger movements corresponds to one or more device commands;

receiving one or more bioacoustic signals conducted by finger bones to one or more piezo-electric contact materials (microphones) at a wrist location, each signal related to the one or more hand gestures including finger movements;

determining the identity of the one or more hand gestures including finger movements based on a positive correlation between the received signals and predetermined hand gesture data which includes finger movement data; and transmitting one or more commands associated with the identified hand gesture which includes finger movement for activating one or more functions of the electronic device.

* * * * *